United States Patent

Thompson et al.

(10) Patent No.: US 12,079,697 B2
(45) Date of Patent: Sep. 3, 2024

(54) SYSTEMS AND METHODS FOR DIVERSITY-ENHANCED ADAPTIVE EXPERIMENTATION IN A MACHINE LEARNING-BASED FORMULATION PLATFORM

(71) Applicant: Turing Labs, Inc., New York, NY (US)

(72) Inventors: Michael L. Thompson, Cincinnati, OH (US); Manmit Shrimali, Oakville (CA); Ajith Govind, Bengaluru (IN)

(73) Assignee: Turing Labs, Inc., New York, NY (US)

( * ) Notice: Subject to any disclaimer, the term of this patent is extended or adjusted under 35 U.S.C. 154(b) by 0 days.

(21) Appl. No.: 18/107,577

(22) Filed: Feb. 9, 2023

(65) Prior Publication Data

US 2023/0259822 A1     Aug. 17, 2023

Related U.S. Application Data

(60) Provisional application No. 63/310,172, filed on Feb. 15, 2022, provisional application No. 63/399,395, filed on Aug. 19, 2022, provisional application No. 63/444,266, filed on Feb. 9, 2023.

(51) Int. Cl.
*G06N 20/00* (2019.01)
*G06N 5/022* (2023.01)

(52) U.S. Cl.
CPC ............ *G06N 20/00* (2019.01); *G06N 5/022* (2013.01)

(58) Field of Classification Search
CPC ................................ G06N 20/00; G06N 5/022
See application file for complete search history.

(56) References Cited

U.S. PATENT DOCUMENTS

2022/0058437 A1*  2/2022  Soni ..................... G06V 10/774
2022/0172258 A1*  6/2022  Jain ..................... G06Q 30/0201

OTHER PUBLICATIONS

Raccuglia, Paul, et al. "Machine-learning-assisted materials discovery using failed experiments." Nature 533.7601 (2016): 73-76. (Year: 2016).*

* cited by examiner

*Primary Examiner* — Kevin W Figueroa
(74) *Attorney, Agent, or Firm* — Padowithz Alce; Alce PLLC (57) ABSTRACT

A method and system for adaptively generating experimental product formulations for accelerating a formulation design of a target product includes constructing a formulation objective function based on a plurality of distinct product-informative formulation parameters of the target product; generating, via a formula-generating machine learning model, a distinct set of product formulation parameter values based on the formulation objective function; constructing a corpus of experimental findings data based on the distinct set of product formulation parameter values generated by the formula-generating machine learning model; automatically adapting the formula-generating machine learning model based on the corpus of experimental findings that accelerate the formulation design of the target product; and generating, via the adapted formula-generating machine learning model, an adapted set of product formulation parameter values that satisfies the one or more formulation objectives thereby enabling an accelerated creation of the target product.

19 Claims, 3 Drawing Sheets

Constructing a Formulation Optimization Function S210

Adaptively Generating Experimental Product Formulations S220

Collecting and Storing Ground Truth Experimental Data S230

Tuning or Iteratively Evolving a Pre-Existing Quantitative Formulation Graphical Network Model S240

Modifying or Adjusting the Formulation Optimization Function S250

SYSTEMS AND METHODS FOR DIVERSITY-ENHANCED ADAPTIVE EXPERIMENTATION IN A MACHINE LEARNING-BASED FORMULATION PLATFORM

CROSS-REFERENCE TO RELATED APPLICATIONS

This application claims the benefit of U.S. Provisional Application No. 63/310,172, filed 15 Feb. 2022, U.S. Provisional Application No. 63/399,395, filed 19 Aug. 2022, and U.S. Provisional Application No. 63/444,266, filed 9 Feb. 2023, which are incorporated in their entireties by this reference.

TECHNICAL FIELD

This invention relates generally to the product formulation technology field, and more specifically to new and useful systems and methods for intelligent formulation discovery in the product formulation technology field.

BACKGROUND

Modern product formulation may be complex and obfuscated, which may create several challenges in product formulation and product experimentation. In particular, institutional knowledge of formulation data for a given product is often distributed in some known and unknown spaces. Additionally, formulation knowledge of expert formulators may not be memorialized in a manner that can be easily transferable into new product formulations.

Accordingly, the disconnect in sources of institutional formulation knowledge creates formulation data gaps, formulation data anomalies, and formulation data conflicts that reduce efficiencies, accuracies, and the quality of product formulations without a single source of truth for formulation data.

Thus, there is a need in the product formulation technology to automatically generate formulation recommendations that have a high probability or likelihood of satisfying formulators' formulation objectives while minimizing a total quantity of real-world experimentations conducted by the formulators. Additionally, there is a further need in product formulation technology to generate formulation recommendations that may be diversity-enhanced in which the formulation recommendations may be intelligently discovered during exploration and exploitation phases in new, under-searched, or un-explored regions of a formulation space.

The embodiments of the present application described herein provide technical solutions that address, at least the needs described above.

BRIEF SUMMARY OF THE INVENTION(S)

In one embodiment, a computer-implemented method for adaptively generating experimental product formulations for accelerating a formulation design of a target physical product, the computer-implemented method includes: constructing a formulation objective function based on a plurality of distinct product-informative formulation parameters of the target physical product, wherein the plurality of distinct product-informative formulation parameters include: (a) one or more product formulation objectives set for the target physical product; (b) one or more formulation design variables associated with the target physical product; and (c) one or more product formulation constraints imposed on the one or more formulation design variables associated with the target physical product; and iteratively generating, via a formula-generating machine learning model, distinct sets of product formulation parameter values based on the plurality of distinct product-informative formulation parameters of the formulation objective function; sequentially executing, via a formulation simulation module, one or more computer-based simulations that simulates a formulation performance of at least one distinct set of product formulation parameter values of the distinct sets of product formulation parameter values based on the formula-generating machine learning model generating the least one distinct set of product formulation parameter values; automatically constructing a corpus of synthetic experimental findings data based on simulation output data of the one or more computer-based simulations; automatically adapting the formula-generating machine learning model based on the corpus of synthetic experimental findings data that causes an intermediate model update of the formula-generating machine learning model; and generating, via the adapted formula-generating machine learning model, an adapted set of product formulation parameter values that likely satisfy the one or more formulation objectives thereby enabling an accelerated creation of the target physical product.

In one embodiment, the computer-implemented method includes wherein automatically adapting the formula-generating machine learning model includes foreclosing an exploration phase of the formula-generating machine learning model based on the corpus of synthetic experimental findings data comprising one or more pieces of synthetic experimental findings data that indicates the exploration phase as successful.

In one embodiment, the computer-implemented method includes automatically adapting the formula-generating machine learning model includes automatically assessing the corpus of synthetic experimental findings data; and based on the automatic assessment identifying that the at least one distinct set of product formulation parameter values increases a satisfaction of the one or more product formulation objectives, tuning the formula-generating machine learning model to reduce or eliminate an exploration phase of parameter values for the one or more formulation design variables.

In one embodiment, the computer-implemented method includes wherein automatically adapting the formula-generating machine learning model includes increasing an exploration phase of the formula-generating machine learning model based on the corpus of synthetic experimental findings data comprising one or more pieces of synthetic experimental findings data that indicates the exploration phase as unsuccessful.

In one embodiment, the computer-implemented method includes wherein automatically adapting the formula-generating machine learning model includes automatically assessing the corpus of synthetic experimental findings data; and based on the automatic assessment identifying that the at least one distinct set of product formulation parameter values decreases a satisfaction of the one or more product formulation objectives, tuning the formula-generating machine learning model to increase an exploration phase.

In one embodiment, the computer-implemented method includes wherein each of the one or more product formulation constraints relate to a model-immutable boundary that restricts the one or more formulation design variables to a predefined range of possible values.

In one embodiment, the computer-implemented method includes wherein each distinct product formulation parameter value of each distinct set of product formulation values of the distinct set of product formulation values relates to a model-derived composition value for a distinct one of the one or more formulation design variables of the formulation objective function.

In one embodiment, the computer-implemented method includes wherein each distinct product formulation parameter value of each distinct set of product formulation values of the distinct set of product formulation values relates to a model inference comprising a distinct composition value for each of the one or more formulation design variables of the formulation objective function.

In one embodiment, the computer-implemented method includes wherein the formula-generating machine learning model is associated with a formulation probabilistic graphical model; and automatically adapting the formula-generating machine learning model includes re-estimating a plurality of distinct parameters of the formulation probabilistic graphical model based on the corpus of synthetic experimental findings data.

In one embodiment, the computer-implemented method includes wherein the formula-generating machine learning model is associated with a formulation probabilistic graphical model; and automatically adapting the formula-generating machine learning model includes (1) re-learning a structure of the formulation probabilistic graphical model based on the corpus of synthetic experimental findings data and (2) re-estimating a plurality of distinct parameters of the formulation probabilistic graphical model based on the corpus of synthetic experimental findings data.

In one embodiment, the computer-implemented method further includes terminating an execution of the formula-generating machine learning model based on identifying a formulation termination request, wherein the formulation termination request indicates that the adapted set of product formulation parameter values satisfies the one or more product formulation objectives set for the target physical product.

In one embodiment, the computer-implemented method further includes at a remote formulation service that is implemented by a network of distributed computers, identifying a quantitative formulation network associated with target physical product, wherein a subset of the one or more formulation design variables is automatically defined by the remote formulation service based on the quantitative formulation network.

In one embodiment, the computer-implemented method includes wherein a subset of the one or more product formulation objectives set for the target physical product is obtained from a subscriber via a graphical user interface; a subset of the one or more formulation design variables associated with the target physical product is obtained from the subscriber via the graphical user interface; and a subset of the one or more product formulation constraints imposed on the one or more formulation design variables is obtained from the subscriber via the graphical user interface.

In one embodiment, the computer-implemented method includes wherein the formula-generating machine learning model is configured to maximize the one or more product formulation objectives set for the target physical product rather than minimizing a predictive uncertainty for the distinct sets of product formulation parameter values generated by the formula-generating machine learning model.

In one embodiment, the computer-implemented method includes wherein an amount of prediction uncertainty of the at least one distinct set of product formulation parameter values is less than an amount of prediction uncertainty of the adapted set of product formulation parameter values.

In one embodiment, the computer-implemented method includes wherein an amount of prediction uncertainty of the at least one distinct set of product formulation parameter values is greater than an amount of prediction uncertainty of the adapted set of product formulation parameter values.

In one embodiment, a computer-implemented method for adaptively generating experimental product formulations for accelerating a formulation design of a target product includes constructing, by one or more computers, a formulation objective function based on a plurality of distinct product-informative formulation parameters of the target product, wherein the plurality of distinct product-informative formulation parameters include: (a) one or more product formulation objectives set for the target product; (b) one or more formulation design variables associated with the target product; and (c) one or more product formulation constraints imposed on the one or more formulation design variables associated with the target product; and generating, via a formula-generating machine learning model, a distinct set of product formulation parameter values for the one or more formulation design variables of the formulation objective function; constructing, by the one or more computers, a corpus of experimental findings data based on the distinct set of product formulation parameter values generated by the formula-generating machine learning model; automatically adapting the formula-generating machine learning model based on the corpus of experimental findings that accelerate the formulation design of the target product; and generating, via the adapted formula-generating machine learning model, an adapted set of product formulation parameter values that likely satisfy the one or more formulation objectives thereby enabling an accelerated creation of the target product.

In one embodiment, the computer-implemented method further includes in response to the formula-generating machine learning model generating the distinct set of product formulation parameter values, automatically executing a computer-based experimental simulation that simulates a formulation outcome of the distinct set of product formulation parameter values; constructing, by the one or more computers, a corpus of synthetic experimental findings data based on simulation output data of the computer-based simulation; and wherein the corpus of experimental findings data includes the corpus of synthetic experimental findings data.

In one embodiment, the computer-implemented method further includes constructing, by the one or more computers, a corpus of ground truth experimental findings data based on subscriber-provided experimental findings data; and wherein the corpus of experimental findings data includes the corpus of ground truth experimental findings data.

In one embodiment, the computer-implemented method further wherein the distinct set of product formulation parameter values generated by the formula-generating machine learning mode is concealed from a subscriber associated with the target product; and the adapted set of product formulation parameter values generated by the adapted formula-generating machine learning mode is exposed to the subscriber via a graphical user interface.

In one embodiment, a computer-implemented method for intelligently generating experimental product formulations in a remote formulation service for accelerating a formulation design of a physical product includes sourcing, from the subscriber, a plurality of distinct formulation parameters for a target physical product; constructing, based on the sourcing, a formulation optimization function that algorithmically or mathematically defines the plurality of distinct formulation parameters in a computer-optimizable structure; implementing, by one or more computers, an automated formulation simulation and optimization module that iteratively proposes distinct sets of experimental product formulations based on the formula optimization function, wherein at least one iteration includes: (i) automatically generating, via a formula-generating machine learning model, a set of experimental product formulations (parameters values of the objective function) based on the formulation optimization function; and (ii) automatically adapting the formula-generating machine learning model based on receiving, from the subscriber, one or more pieces of real-world experimental findings data associated with the diversity-enhanced set of experimental production formulations; and terminating an execution of the automated formulation simulation and optimization module in response to receiving a termination request from the subscriber, wherein termination request indicates that one of the experimental product formulations of the diversity-enhanced set of experimental production formulations satisfies the one or more product formulation optimization parameters set for the target physical product.

In one embodiment, a computer-implemented method for intelligently generating experimental product formulations in a remote formulation service for accelerating a formulation design of a physical product includes identifying a quantitative formulation network associated with a physical product of a subscriber to the remote formulation service; sourcing, from the subscriber, a plurality of distinct formulation parameters for a target physical product based on the quantitative formulation network, wherein the plurality of distinct formulation parameters include: (a) one or more product formulation optimization parameters set for the target physical product; and (b) one or more product formulation constraint parameters imposed on the target physical product; constructing, based on the sourcing, a formulation optimization function that algorithmically or mathematically defines the plurality of distinct formulation parameters in a computer-optimizable structure; implementing, by one or more computers, an automated formulation simulation and optimization module that iteratively proposes distinct sets of experimental product formulations based on the formula optimization function, wherein at least one iteration includes: (i) automatically generating, via a formula-generating machine learning model, a distinct set of experimental product formulations based on the formulation optimization function; (ii) automatically performing one or more computer-based simulations that (1) simulates a product performance associated with at least a subset of the distinct set of experimental product formulations and (2) generates one or more pieces of synthetic experimental findings data based on the one or more computer-based simulations; (iii) automatically tuning the formula-generating machine learning model based on the one or more pieces of synthetic experimental findings data; (iv) generating, via the formula-generating machine learning model, a diversity-enhanced set of experimental production formulations based on the automatic tuning, wherein the diversity-enhanced set of experimental production formulations is accessible to the subscriber; and (v) automatically re-tuning the formula-generating machine learning model based on receiving, from the subscriber, one or more pieces of real-world experimental findings data associated with the diversity-enhanced set of experimental production formulations; and terminating an execution of the automated formulation simulation and optimization module in response to receiving a termination request from the subscriber, wherein termination request indicates that one of the experimental product formulations of the diversity-enhanced set of experimental production formulations satisfies the one or more product formulation optimization parameters set for the target physical product.

In one embodiment, a computer-implemented method for adaptively generating experimental product formulations for accelerating a formulation design of a target physical product, the computer-implemented method comprising constructing, by one or more computers, a machine learning-based generative model based on one or more corpora of product formulation data, wherein a graphical structure of the machine learning-based generative model is created based on the one or more corpora of product formulation data; defining, by the one or more computers, a formulation objective maximum value based on an evaluation of a formulation objective function associated with the target physical product against the one or more corpora of product formulation data; iteratively generating, via the machine learning-based generative model, a distinct batch of candidate experimental product formulations for each distinct formulation round of a predetermined number of formulation rounds, wherein each iteration includes: (a) implementing, by the one or more computers, a surrogate formulation probabilistic graphical model specifically configured for a current formulation round; (b) generating, via the machine learning-based generative model, a diverse batch of candidate experimental product formulations based on maximizing a formulation acquisition function associated with the surrogate formulation probabilistic graphical model; (c) executing, by the one or more computers, one or more computer-based experimental simulations that simulate a formulation performance of the diverse batch of experimental product formulations based on the generating of the diverse batch of candidate experimental product formulations; and (d) updating, for a formulation round subsequent to the current formulation round, the surrogate probabilistic graphical model to an updated surrogate probabilistic graphical model based on one or more corpora of experimental findings data generated for the diverse batch of experimental product formulations, wherein the one or more corpora of experimental findings data include: (i) a corpus of experimental findings data comprising simulation output data of the one or more computer-based experimental simulations associated with the diverse batch of candidate experimental product formulations; and (ii) a corpus of ground truth experimental findings data comprising subscriber-informed experimental findings data associated with the diverse batch of candidate experimental product formulations; and terminating an execution of the machine learning-based generative model based on identifying a formulation termination request that indicates that one of the distinct batches of candidate experimental product formulations satisfies the one or more product formulation objectives set for the target physical product thereby enabling an accelerated creation of the target physical product.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Intelligent Product Formulation System

Figure 1:
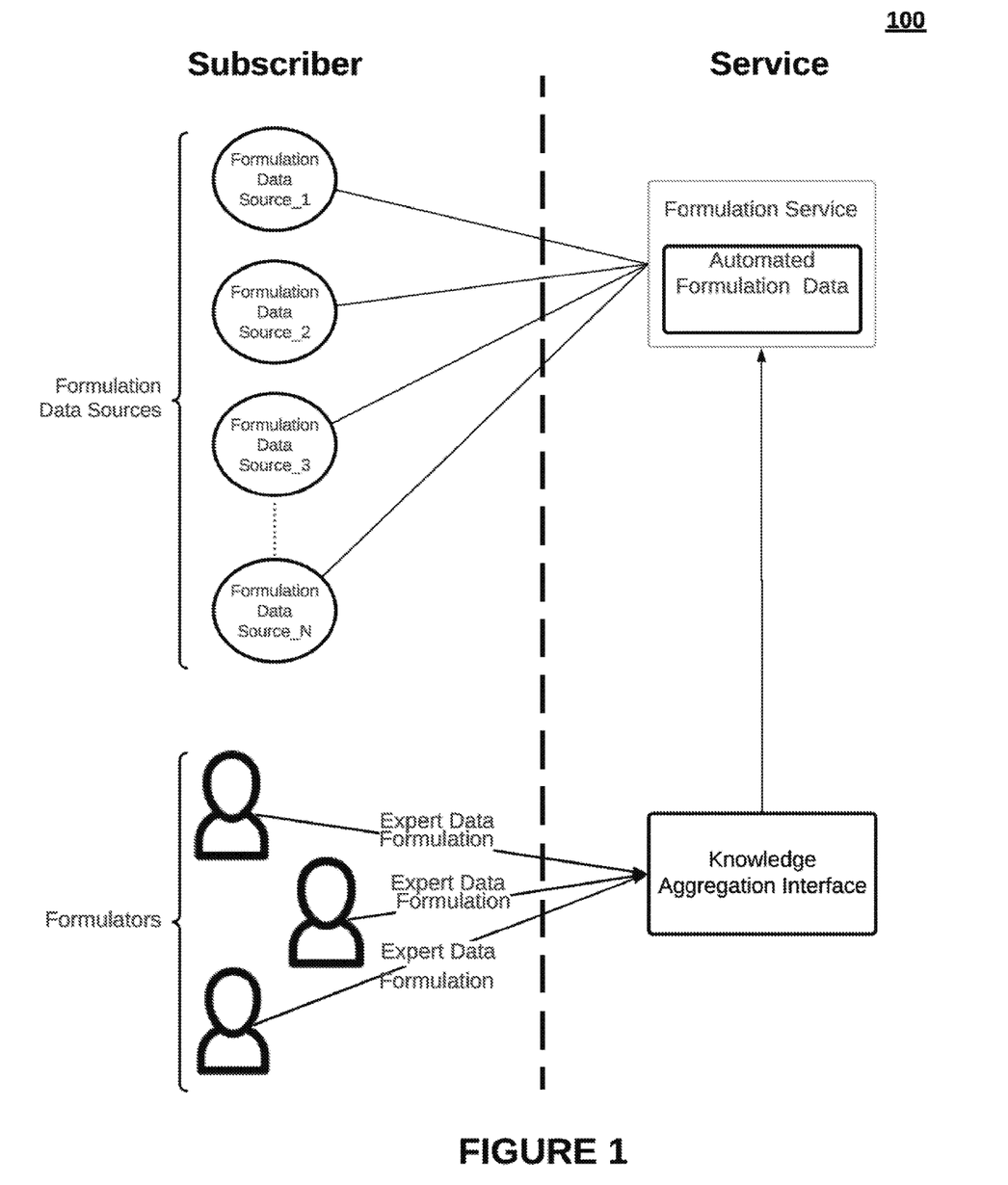
FIG. 1 illustrates a schematic representation of a system 100 in accordance with one or more embodiments of the present application.

As shown in FIG. 1, a system 100 for intelligent product formulations and/or experimentations may include a remote formulation service 110 and expert formulation graphical user interface 120.

The remote formulation service 110, which may be referred to herein as the "formulation service", may have an integrated communication connection with a plurality of distinct sources of formulation data and/or product data of a target product. The remote formulation service no preferably enables an integration of formulator expertise data together with existing product formulation data and a generation of a visualization of the formulator expertise integrated structure, as shown by way of example in FIG. 1.

In one or more embodiments, the remote formulation service 110 includes a plurality of distinct formulation modules that provide enhanced formulation capabilities for intelligently generation of one or more formulations of a target product. In such embodiments, the remote formulation service no includes an insight explorer module, a lab bench module, and a workspace module. In one embodiment, the insight explorer module may enable formulators and/or subscribers to the formulation service to explore, evaluate, and/or manipulate one or more intelligent formulation tools, such as a quantitative formulation network (e.g., Digital Brain). In one embodiment, the lab bench module may provide one or more formulation tools including, but not limited to, a formulation simulation tool and a formulation optimization tool. In one embodiment, the workspace module may provide a virtual formulation workspace for creating product formulations, executing formulations, and/or storing formulation result data.

The expert formulation graphical user interface 120, which may be sometimes referred to herein as the "expert interface", may be in operable control communication with the remote formulation service 110. In one or more embodiments, the expert interface 120 may include a formulation application programming interface (API) that may be programmatically integrated with one or more APIs of the remote formulation service 110 and one or more APIs of one or more sources of formulation data and/or product data.

Additionally, or alternatively, the system or service 100 may include a machine learning subsystem (not shown) that may be intelligently configured to assist in automatically generating or setting formulation parameters and/or actively implement simulations and/or optimizations (e.g., for formulation experiments, etc.) of one or more formulations.

Additionally, or alternatively, the machine learning subsystem may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), (generative) adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

Figure 2:
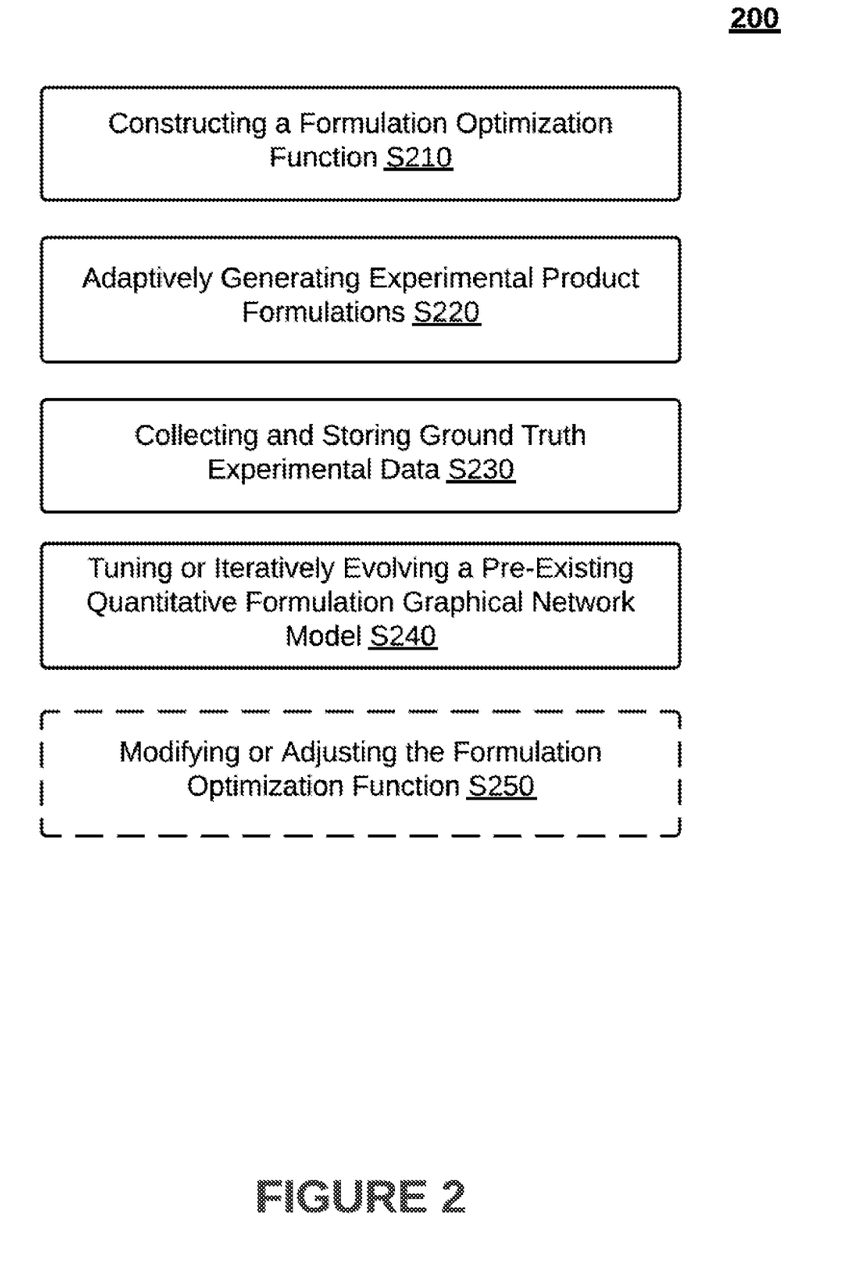
FIG. 2 illustrates an example method 200 in accordance with one or more embodiments of the present application.

2. Method for Diversity-Enhanced Formulation Discovery in a Machine Learning-Based Formulation Platform As shown by reference to FIG. 2, a method 200 for generating diversity-enhanced product formulations may include constructing a formulation optimization function S210, adaptively generating experimental product formulations based on the formulation optimization function S220, collecting and storing ground truth experimental data associated with the adaptively generated experimental product formulations S230, and tuning or iteratively evolving a pre-existing quantitative formulation graphical network S240. The method 200 may optionally include intermediately adapting a formulation generating-model for diversity-enhanced formulations based on synthetic data S225 and modifying or adjusting the formulation optimization function S250.

2.10 Constructing a Formulation Optimization Function

S210, which includes constructing a formulation optimization function, may function to construct or define a formulation optimization function (i.e., a maximization or minimization objective function) based on one or more formulation parameters (e.g., subscriber-provided optimization parameters, service-defined optimization parameters, and/or the like). Formulation parameters, in a preferred embodiment, may relate to at least one or more of outcome metrics, formulation variables or product components (e.g., decision variables), and formulation constraints (e.g., limits, bounds on decision variables, and the like) associated with a target product (e.g., target physical product or the like).

In one or more embodiments, a subscriber (or formulator) interfacing with the formulation service may function to provide formulation parameters in an unstructured manner or a non-optimized form and, in turn, S210 may function to convert the formulation parameters into a computer-solvable (formulation) optimization function. That is, in some embodiments, S210 may function to convert the outcome metrics (or goals) subject to formulation constraints of the formulation variables to a maximization or a minimization objective function (i.e., formulation optimization function). It shall be recognized that the phrase "formulation optimization function" may be interchangeably referred to herein as a "objective function" and/or a "formulation optimization request."

Preferably, in one or more embodiments, S210 may function to implement a formulation design (graphical user) interface that may be accessed by or presented to a target formulator for input of formulation parameters, formulation data, and/or the like. Additionally, or alternatively, in one or more embodiments, the formulation parameters may be (e.g., automatically) derived based on a target product type, human expert intelligence, human expert aptitude of the target product type, a platform-derived formulation network (i.e., Digital Brain), and/or the like, as described in U.S. patent application Ser. No. 18/105,243, titled SYSTEMS AND METHODS FOR ACCELERATING PRODUCT FORMULATION CREATION VIA IMPLEMENTING A MACHINE LEARNING-DERIVED GRAPHICAL FORMULATION NETWORK MODEL, which is incorporated herein in its entirety by this reference. Accordingly, based on receiving or identifying the formulation parameters, S210 may function to transmit a request signal to the system 100 and/or the formulation service implementing the method 200 to initialize one or more experimentations for formulation discovery by initially constructing a formulation optimization function based on the input of the formulation parameters.

Additionally, or alternatively, in one or more embodiments, S210 may function to define or set a plurality of distinct formulation parameters for a formulation objective function based on a target quantitative formulation network associated with a target product as described in U.S. patent application Ser. No. 17/978,960, filed on 1 Nov. 2022, titled SYSTEMS AND METHODS FOR GENERATING AN EXTENSIBLE DIGITAL FORMULATION NETWORK MODEL AND IMPLEMENTING AN INTELLIGENT FORMULATION USING THE FORMULATION NETWORK MODEL, which is incorporated herein in its entirety by this reference. In such embodiments, S210 may function to automatically extract (or derive) a set of formulation parameters (e.g., formulation design variables, formulation constraints, etc.) from the target quantitative formulation network and set the extracted (or derived) formulation parameters to be included in a construction of the formulation objective function.

A formulation optimization function or a formulation optimization request, as generally referred to herein, may comprise a plurality of distinct components that define the formulation optimization function. As described in more detail below, the formulation optimization function may include one or more formulation objectives, one or more formulation design variables (e.g., ingredients, etc.) that may be utilized to satisfy the one or more formulation objectives, and/or one or more formulation constraint parameters (e.g., ingredient regulation requirements, etc.) that may be imposed on the one or more formulation objectives and/or the one or more formulation design variables. In other words, the formulation optimization function (or the formulation optimization request) may be derived and/or defined based on formulation optimization objectives (e.g., metrics), formulation design variables (e.g., ingredients, conditions, and/or the like), and/or one or more formulation constraints (e.g., ingredient, condition, metrics boundaries) for which the system or service 100 may account or optimize when adaptively generating experimental product formulations as described in more detail in S220.

Formulation Target(s) or Metric(s)

As briefly mentioned above, in one or more embodiments, S210 may function to source or collect one or more formulation metrics or targets based on a target formulator, a subscriber, and/or the service providing the one or more formulation metrics via the formulation design (graphical user) interface or the like. A formulation metric or target (or a product formulation objective), as generally referred to herein, may be an overall intent or goal (e.g., desired effect, desired metrics or efficacies) that a given formulator may desire to minimize, maximize, and/or improve in a target formulation experimentation and/or a target physical product. Stated another way, a formulation metric may be a product formulation objective set for a target physical product (e.g., minimize cost, maximize a target product performance, etc.).

For instance, in a non-limiting example, S210 may function to receive a formulation metric or target from the target formulator seeking to minimize or, at least, reduce a formulation cost associated with a target (or baseline) formulation composition. In the same or another non-limiting example, S210 may function to receive a formulation objective seeking to maximize or, at least, increase a performance attribute or characteristic associated with a target (or baseline) formulation composition.

Formulation Design Variables and Formulation Constraints

As briefly mentioned above, in one or more embodiments, S210 may function to identify one or more formulation design variables based on the target expert or subscriber providing the one or more formulation design variables or potentially (e.g., automatically) sourcing, by one or more computers, formulation design variables via the platform-derived formulation network. A formulation design variable, in some embodiments, may be an ingredient, condition, and/or component that may be modified in value to satisfy the formulation metric(s) or target(s). For instance, in a non-limiting example, S210 may function to receive formulation design ingredients from a target subscriber and/or the service via a quantitative formulation network, such as, ingredient "X", ingredient "Y", and ingredient "Z" and similarly, condition "A", condition "B", and condition "C".

Additionally, or alternatively, in one or more embodiments, S210 may function to identify formulation constraint criteria based on the formulator, automatically deriving formulation constraint criteria from a quantitative formulation network, and/or the subscriber providing formulation constraint parameters. A formulation constraint, as generally referred to herein, may be a limitation that may be imposed on the formulation objectives and/or the formulation design variables (e.g., formulation ingredients). Stated another way, a formulation constraint may be a product formulation constraint that relates to a model-immutable boundary that restricts one or more formulation design variables to a predefined range of possible values. For instance, in a non-limiting example, S210 may function to receive a formulation constraint criterion from a target subscriber that the total cost of the formulation is required to be below a target threshold value. In the same or another non-limiting example, S210 may function to receive a formulation constraint criterion that ingredient "X" may be required to be within a target composition range and ingredient "Y" may be required to be above a target composition value.

Accordingly, in operation, S210 may function to generate, by one or more computers of the intelligent product formulation service, the formulation optimization function that algorithmically or mathematically expresses the subscriber-provided (and/or the service-provided) product formulation objectives, the subscriber-provided (and/or service-provided) formulation design variables, and the subscriber-provided (and/or service-provided) product formulation constraints in a computer-solvable (or computer-optimizable) structure (e.g., a mathematical expression or the like).

2.20 Generating Experimental Formulations|Exploration-Exploitation

S220, which includes adaptively generating experimental product formulations, may function to service or system-generate one or more distinct batches or distinct sets of experimental formulations (e.g., distinct sets of product formulation values, distinct sets of candidate experimental product formulations, or the like) based on the formulation optimization function constructed by S210. Preferably, S220 may function to iteratively generate n-number of distinct sets or batches of experimental formulations over n-number of distinct time periods until the formulation optimization function is satisfied (e.g., S220 may function to generate a first distinct set of experimental formulations at a first period and a second distinct set of experimental formulations at a second period, etc.).

It shall be recognized that each distinct set or batch of experimental formulations generated by S230 may include one experimental product formulation or a plurality of distinct experimental product formulations. Accordingly, each distinct experimental product formulation may include a plurality of distinct product formulation composition values that correspond to a plurality of distinct formulation design variables of the formulation objective function, respectively (e.g., ingredient "X", ingredient "Y", and ingredient "Z" are formulation design variables and the plurality of distinct product formulation composition values may be 25% of ingredient "X", 25% of ingredient "Y", and 50% of ingredient "Z" for one experimental product formulation, ingredient "X", ingredient "Y", and ingredient "Z" are formulation design variables and the plurality of distinct product formulation composition values may be 15% of ingredient "X", 15% of ingredient "Y", and 70% of ingredient "Z" for another experimental product formulation, etc.)

Machine Learning-Based Generation of Experimental Formulations

In a first implementation, S220 may function to adaptively generate, via a formula-generating machine learning model, one or more sets (or batches) of (e.g., candidate) experimental formulations and surface the one or more sets of experimental formulations to a target subscriber for physical or real-world experimentation. For instance, in a non-limiting example, S220 may function to construct and/or implement a Bayesian network (machine learning-based) optimization algorithm to adaptively generate the one or more sets of experimental formulations (e.g., one or more distinct sets of product formulation values). In such example, S220 may function to implement the Bayesian network to simultaneously explore and exploit the formulation space, which may be an n-dimensional or high-dimensional space defined by a plurality of the experiment variables, conditions, and the like. It shall be noted that, in one or more embodiments, the formula-generating machine learning model may also be referred to herein as a "machine learning-based generative model", which may be trained on one or more corpora of product formulation data in which a graphical structure and parameters of the graphical structure may be created based on the one or more corpora of product formulation data.

It shall be noted that a continuous mix of exploration and exploitation may be based on where a target experimental formulation lies along an exploration-to-exploitation spectrum and an amount of prediction uncertainty or prediction variance. In some embodiments, one or more proposed experimental formulations identified during an exploration phase may be associated with a high prediction uncertainty while another set of proposed experimental formulation identified during an exploitation phase may be associated with low prediction uncertainty. For instance, in a non-limiting example, a first experimental formulation generated via the formula-generating machine learning model may be discovered during exploration, thus associated with a high prediction uncertainty value and contemporaneously, a second experimental formulation generated via the formula-generating machine learning model may be discovered during exploitation, thus, associated with a low prediction uncertainty value.

It shall be further noted that a formula-generating machine learning model may recommend, at any time during the adaptive experimentation process, an experimental formulation (e.g., a winning formulation or the like) that, when conducted or executed in real-word experimentation, satisfies the defined formulation objectives. Thus, the experimentation formulation (e.g., the winning formulation) may have any degree or level of prediction uncertainty as the formula-generating machine learning model attempts to maximize the formulation objectives rather than minimizing the predictive uncertainty.

In one or more embodiments, a successful exploration of the formulation space may inform one or more distinct regions of variable values that may be exploited for optimizing or improving the metrics of the formulation objective function.

In the same or one or more alternative embodiments, S220 may additionally function to implement the Bayesian network (e.g., the formula-generating machine learning model, the machine learning-based generative model, etc.) to exploit variable values from within the one or more distinct regions of the formulation space having a likelihood of successful satisfying the formulation optimization function to further predict potential variable values (sets or batches) that further improve the metrics of the formulation optimization function until one or more predetermined optimization criteria are either satisfied and/or exceeded.

However, it shall be recognized that S220 may function to implement any suitable optimization algorithm, either singly or in combination, to optimize the formulation optimization function constructed by S210. It shall also be noted that the formula-generating machine learning model may be specifically trained on formulation data including, but not limited to, subject matter expertise (e.g., domain expert's knowledge, human expert intelligence, human expert aptitude, or the like), real-word or synthetic (measured) numerical data associated with a target product of a target subscriber. That is, the machine learning model may be a product-specific and/or subscriber-specific machine learning model having a learning structure derived based on specific product data and/or specific subscriber data. In a non-limiting example, S220 may function to iteratively generate, via a machine learning-based generative model, a distinct batch of candidate experimental product formulations for each distinct formulation round of a predetermined number of formulation rounds that may be defined by the remote formulation service and/or subscriber to the remote formulation service in which each iteration may include one or more of implementing, by one or more computers, a surrogate or proxy formulation probabilistic graphical model specifically configured for a current formulation round; generating, via a machine learning-based generative model, a diverse batch of candidate experimental product formulations based on maximizing a formulation acquisition function associated with the surrogate formulation probabilistic graphical model; executing, by the one or more computers, one or more computer-based experimental simulations that simulate a formulation performance of the diverse batch of experimental product formulations based on the generating of the diverse batch of candidate experimental product formulations; and updating, for a formulation round subsequent to the current formulation round, the surrogate probabilistic graphical model to an updated surrogate probabilistic graphical model based on one or more corpora of experimental findings data generated for the diverse batch of experimental product formulations in which the one or more corpora of experimental findings data include a corpus of experimental findings data comprising simulation output data of the one or more computer-based experimental simulations associated with the diverse batch of candidate experimental product formulations and/or a corpus of ground truth experimental findings data comprising subscriber-informed experimental findings data associated with the diverse batch of candidate experimental product formulations.

Additionally, or alternatively, in one or more embodiments, the surrogate or proxy model preferably relates to or includes a Gaussian Process model of a target objective function for a given formulation. In such embodiments, the surrogate model may function to estimate of an experimental performance of a set of proposed formulation variable values (e.g., proposed values of x, y, etc.) contemporaneous with or simultaneously with a continued exploration or exploitation of other proposed sets of formulation variable values. At least one technical benefit of a creation and implementation of the surrogate model, which may be a proxy for real-world experimentation, may include an intermediate (i.e., mid-formulation variable value identification) simulated experimentation of proposed sets of formulation variable values and an enablement of a bypass of real-world experimentation on a set of proposed formulation variable values thereby accelerating testing of the proposed formulation values using the surrogate model. In this way, an efficacy and/or performance of a set of proposed formulation values may be determined in real-time or near real-time (rather than days or weeks in a real-world experimentation) and thereby accelerating an adaptation of a primary probabilistic graphical model implemented in a Bayesian optimization.

In operation, the Bayesian network (machine learning-based) optimization model may function to sequentially generate one or more sets or batches of experimental or proposed formulations that may include a plurality of distinct formulations during exploration and exploitation phases of the Bayesian search. In such embodiments, each distinct set or batch of experimental formulations may include distinct formulation variable values that enable subscribers to intelligently experiment in the formulation space and/or discover a plurality of distinct formulations that may optimize the formulation optimization function. That is, in one or more embodiments, S220 may function to iteratively generate, via a formula-generating machine learning model, distinct sets of product formulation parameter values based on the plurality of distinct product-informative formulation parameters of the formulation objective function (e.g., each distinct product formulation parameter value of each distinct set of product formulation values relates to a model-derived composition value for a distinct one of the one or more formulation design variables associated with the target physical product/objective function, each distinct product formulation parameter value of each distinct set of product formulation values relates to a model inference comprising a distinct composition value for each of the one or more formulation design variables associated with the target physical product/objective function, etc.).

It shall be recognized that the formulation data may be obtained via one or more channels as described in U.S. Patent Application No. 63/297,410, filed on 7 Jan. 2022, titled SYSTEMS AND METHODS FOR GENERATING AN EXTENSIBLE DIGITAL FORMULATION NETWORK MODEL AND IMPLEMENTING AN INTELLIGENT FORMULATION USING THE FORMULATION NETWORK MODEL, which is incorporated herein in its entirety by this reference.

2.25 Diverse-Generation of Candidate Experimental Formulations

Figure 3:
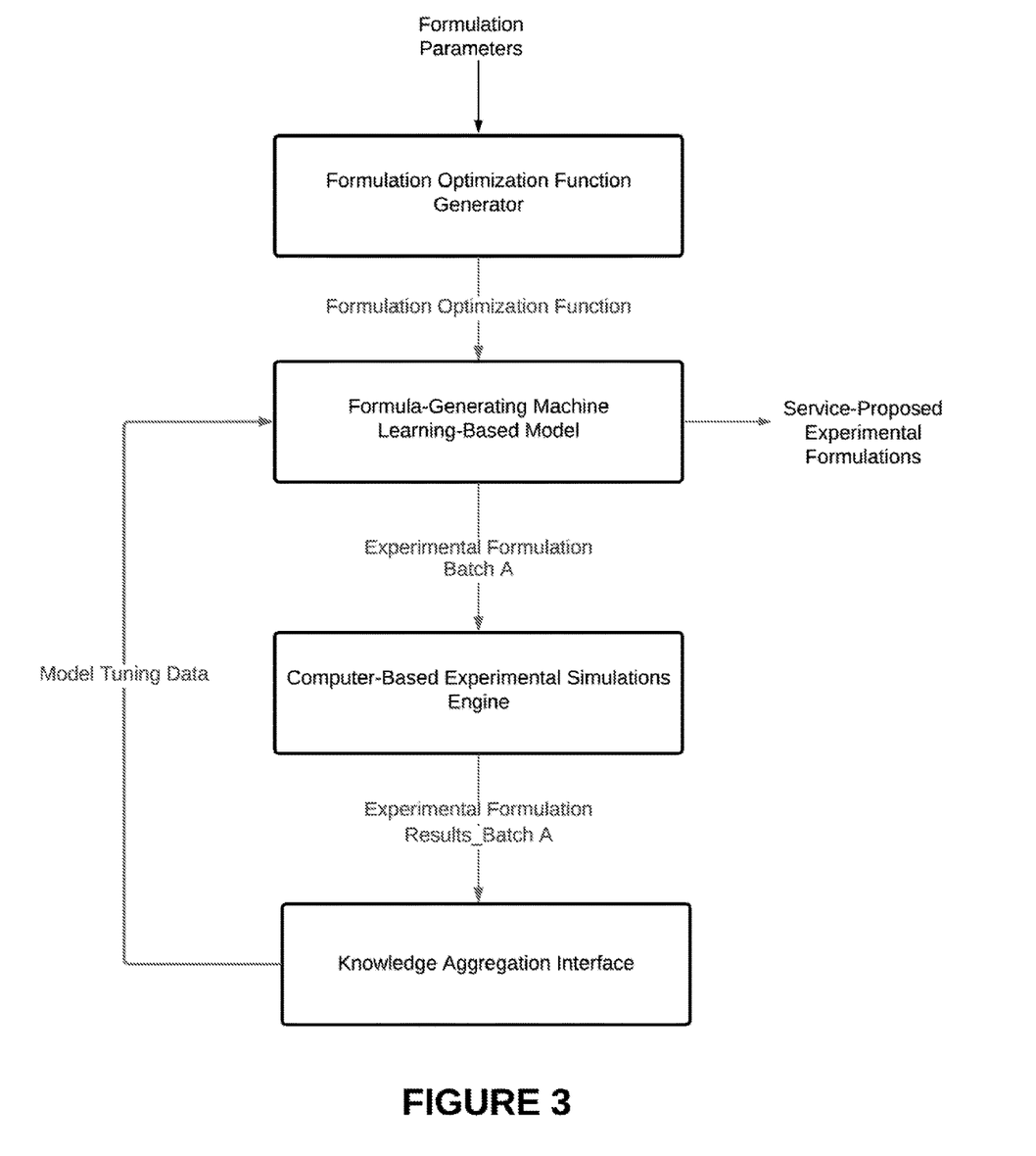
FIG. 3 illustrates an example schematic for generating diversity-enhanced product formulations in accordance with one or more embodiments of the present application.

Optionally, S225 may function to sequentially perform hypothetical or (computer) simulated experiments for generating one or more pieces of synthetic experimental findings data. In one embodiment, S225 may function to automatically generate one or more diverse sets or batches of experimental (proposed or candidate) formulations using, in part, the above-mentioned formula-generating machine learning model, as shown generally by way of example in FIG. 3. In one or more embodiments, prior to exposing experimental (product) formulations to a target formulator, the formulation-generating machine learning model may generate a set of experimental formulations that may be concealed (e.g., not exposed) to the target subscriber and, in turn, S225 may function to automatically and/or sequentially perform computer-based experimental simulations (i.e. non-real-world experiments) on the (experimental) formulations outputted by the formulation-generating machine learning model via a diversity-generating formulation algorithm, a simulation model, and/or the like. Accordingly, the results or output of the computer-based experimental simulations may be synthetic experimental findings data (e.g., simulation-based experimental results data).

In one or more embodiments, a system or service implementing the method 200 may function to iteratively generate, via a formula-generating machine learning model, distinct sets of product formulation parameter values based on the plurality of distinct product-informative formulation parameters of the formulation objective function. Accordingly, in one or more embodiments, S220 may function to sequentially execute, via a formulation simulation module of the remote formulation service, one or more computer-based simulations that simulates a formulation performance of at least one distinct set of product formulation parameter values (e.g., a plurality of distinct sets of product formulation parameter values) of the distinct sets of product formulation parameter values. Additionally, or alternatively, in one or more embodiments, S220 may function to automatically construct a corpus of synthetic experimental findings data based on simulation output data of the one or more computer-based simulations.

Intermediate Model Tuning|Intermediate Model Adaptation

In one or more embodiments, S220 may function to intermediately recalibrate, tune, adapt, or update the formula-generating machine learning model based on a corpus of synthetic experimental findings data comprising one or more pieces of synthetic (simulated) experimental findings data outputted by (or based on) the one or more computer-based simulations. That is, the intermediate updates to the formula-generating machine learning model or Bayesian network may be informed by the distinct synthetic experimental findings data preferably during or contemporaneous with the exploration-exploitation phases and real-world experimentations while attempting to satisfy the formulation optimization function.

In one or more embodiments, the intermediate adaptations to the Bayesian network or similar formulation-generating machine learning model may direct the Bayesian network to increase or decrease an exploration of the formulation space and correspondingly, increase or decrease an exploitation of distinct regions (i.e., previously un-explored regions) of the formulation space. In the circumstance in which an exploration may be increased due to the intermediate updates to the Bayesian network, the predicted formulations may be increased in diversity based on a hyper-exploration (i.e., increased) to new or previously under-searched regions of the formulation space.

Accordingly, based on the recalibration, tuning or updating, the formula-generating machine learning model may function to regenerate a new set of experimental formulations (e.g., experimental formulation values of the formulation design variables, etc.) that may be exposed to a target formulator or subscriber and include a combination of experimental formulations that more effectively explores diverse regions of the formulation design space when compared to the original set of experimental formulations (e.g., experimental formulations may be proposed by the intelligent product formulation service to resolve the formulation knowledge gaps of the formula-generating machine learning model).

It shall be noted that, in one or more embodiments, the formula-generating machine learning model may be iteratively updated to an updated formula-generating machine learning model based on one or more corpora of experimental findings data associated with a target (or subject) diverse batch of experimental product formulations. In such embodiments, the one or more corpora of experimental findings data may include a corpus of experimental findings data comprising simulation output data of the one or more computer-based experimental simulations associated with the a target (or subject) diverse batch of candidate experimental product formulations and/or a corpus of ground truth experimental findings data comprising subscriber-informed experimental findings data associated with the target (or subject) diverse batch of candidate experimental product formulations Contextual Intelligence|Explainable Formulation Rationale Optionally, in one or more embodiments, S220 may function to expose, to a subscriber, formulation rationale that includes a likely or probable reasoning that explains the one or more formulation predictions of the formulation-generating machine learning model. In one or more embodiments, the formulation rationale may be informed by differences or changes in a proposed formulation and differences or changes in the formulation optimization function or any specific outcome or experimentation results between sequential or compared formulations. In one embodiment, S220 may function to generate a formulation rationale based on performing a formulation pairwise assessment that evaluates a baseline formulation (e.g., a historical formulation, a benchmark formulation, and/or the like) against a target formulation. The formulation pairwise assessment may include an identification of changes in the types and/or values of formulation variables (e.g., formulation design variables or the like) between the baseline formulation and the target formulation (e.g., a target experimental product formulation generated by the formula-generating machine learning model, or the like). Additionally, the formulation pairwise assessment may include an identification and/or measure of the differences in the experimental outcomes of the baseline formulation and the target formulation. In such embodiment, the identified difference in the formulation variables and the experimental outcomes may inform or enable a deduction of a formulation rationale that may expose drivers of the formulation prediction (of the formulation-generating machine learning model.

A baseline formulation, as generally referred to herein, may be a production-implemented formulation, a pre-defined (or benchmarked) formulation, or any other suitable (baseline) formulation that may be associated with experimental findings data (e.g., simulation-based experimental findings data and/or physical experimental findings data). A target (experimental) formulation, as generally referred to herein, may be any one of the experimental formulations included in a set of experimental formulations computed by the formula-generating machine learning model.

In one or more embodiments, the formulation rationale for a target formulation pairwise may be exposed (or displayed) on any graphical user interface of the intelligent product formulation service. It shall be recognized that the formulation rationale may include textual and/or graphical content indicating why a composition of the target (experimental) product formulation may be expected to outperform a composition of the baseline product formulation.

It shall be further recognized that, in some embodiments, the formulation rationale may be derived based on objection function differences, differences in formulation results or the like.

Contextual Intelligence|Experimental Design Metric

Additionally, in the same or an alternative embodiment, S220 may function to automatically compute, by one or more computers, an inference of the total number of physical experiments (e.g., experimental count) that may be needed or required to satisfy a formulation optimization function constructed by S210. In such embodiments, based on the computation, S220 may function to surface or expose the experimental count to a target subscriber or the like via a user interface of the formulation service.

It shall be noted that, in one or more embodiments, S220 may function to compute a prediction of the total number of experiments or experimental count by iteratively performing computer-based simulations (e.g., computed-based experiments) on the service-proposed experimental formulations computed by the formula-generating machine learning model until the product formulation optimization function is satisfied. In such embodiments, the total quantity or count of the physical number of experiments to perform may be equivalent or substantially similar to a count of the computer-based simulations performed.

It shall be noted that the adaptive generation of experimental product formulations may be terminated, at any time during the adaptive experimentation process, by receiving a formulation termination signal as described in more detail in S230.

2.30 Collecting and Storing Ground Truth Experimental Data

S230, which includes iteratively collecting and storing ground truth experimental data, may function to collect and store ground truth experimental data associated with one or more of the sets or batches of service or system-generated experimental formulations provided by S220. In one or more embodiments, formulators or subscribers to the formulation service may perform one or more real-world (e.g., physical laboratory) experiments (e.g., real-life laboratory experiments) based on the service or system-proposed experimental formulations, and S230 may function to receive (e.g., collect and store) the experimental results or experimental findings of the one or more physical or real-life laboratory experiments via one or more data upload channels of the intelligent product formulation service.

In one or more embodiments, S230 may function to collect or receive experimental results data or experimental findings data on a per (experimental) formulation set or batch basis. For instance, in a non-limiting example, S220 may function to propose or generate, at a first-time span, a first set of experimental product formulations and, accordingly, S230 may function to collect, via a user interface, experimental results data or experimental findings data associated with the first set of experimental product formulations. In another non-limiting example, based on receiving the experimental results or experimental findings associated with the first set of experimental product formulations, S220 may function to propose, at a second-time span, a second set of experimental product formulations, via the above-mentioned formula-generating machine learning model, and, accordingly, S230 may function to collect, via the user interface, experimental results or experimental findings associated with the second set of experimental product formulations. It shall be noted that the above-described relationship between S220 and S230 may be iteratively repeated n-number of times.

Stated another way, in one or more embodiments, S230 may function to construct, by one or more computers, a corpus of ground truth experimental findings data based on subscriber-provided experimental findings data that includes one or more pieces of ground truth experimental findings data.

In a first implementation, a target subscriber or formulator may upload one or more documents (or files) comprising the experimental findings data or the experimental results data via a graphical user interface. In such embodiments, the one or more documents (or files) may include quantitative data and/or qualitative data that include experimental findings or results associated with one or more target sets of service-proposed (experimental) product formulations. At least one technical benefit of such implementation may provide formulators a streamlined data upload approach, which may reduce the time required for formulators to receive the next set of experimental formulations, if applicable.

In a second implementation, S230 may function to receive automatic pushes of the experimental findings data or the experimental results data in real-time or near real-time via one or more application programming interfaces, which may reduce a burden on the subscriber or formulator to manually upload the experimental findings or results. For instance, in a nonlimiting example, S230 may function to receive or collect batches of experimental findings data or experimental results data, via one or more application programming interfaces, in real-time or near real-time as physical or real-life laboratory experiments are actively performed.

It shall be noted that, in one or more embodiments, S230 may function to transmit a formulation termination signal (e.g., formulation success signal) to the formulation service that, in turn, may terminate an active (e.g., on-going) adaptive experimentation process (e.g., generating service-proposed (experimental) formulations). In such embodiments, S230 may function to transmit the formulation termination signal based on the experimental results or experimental findings satisfying the (product) formulation objective. Additionally, or alternatively, in one or more embodiments, S230 may function to transmit the formulation termination signal based on detecting a subscriber (or formulator) input indicating that the experimental results or experimental findings satisfy the product formulation objective (e.g., via a selection of a user interface object or the like). Stated another way, in one or more embodiments, S230 may function to terminate an execution of a formula-generating machine learning model based on identifying a formulation termination request that indicates that the one of formulation parameter values in one of the distinct sets of product formulation parameter values satisfies the one or more product formulation objectives set for the target physical product.

2.40 Tuning or Iteratively Evolving the Predictive Model(s)

S240, which includes tuning or iteratively evolving the predictive model, may function to update or tune the formula-generating machine learning model based on real-world experimental findings data. In a preferred embodiment, S240 may function to automatically adapt the formula-generating machine learning model or the like based on a corpus of experimental findings data (e.g., a corpus of synthetic experimental findings data, a corpus of ground truth experimental findings data, and/or the like).

In a first implementation, S240 may function to adapt, tune, or update the predictive model (e.g., the formula-generating machine learning model, the Bayesian belief network, etc.) based on one or more corpora of experimental findings data, which may include relearning a structure and re-estimating parameter values of a probabilistic graphical model (e.g., the Bayesian belief network or the like). In this first implementation, S240 may function to reconstruct the graphical nodes (e.g., formulation design variables) and graphical edges (e.g., dependency edges) connecting the nodes that represent the formulation design variables and associated conditional dependencies via a directed acyclic graph or the like. In such embodiments, if the experimental findings data indicate a sufficient dissonance in the dependencies and/or relationships between variables of the probabilistic graphical model, S240 may determine that a restructuring of the PGM may be required to accurately represent the dependencies and/or relationships between design variables.

In a second implementation, S240 may function to tune or update the predictive model (e.g., the formula-generating machine learning model, the Bayesian belief network, etc.) based on one or more corpora of experimental findings data, which may include re-estimating parameter values of a probabilistic graphical model associated with the formula-generating machine learning model. In such embodiments, if the experimental findings data indicate a misalignment of a strength of one or more dependency connections of the PGM, S240 may only re-compute probability values or strength of connection metrics for one or more dependency connections of the PGM.

In one or more embodiments, the PGM comprises a generated quantitative formulation graphical network model. In one or more embodiments, a pre-existing quantitative formulation graphical network may include a graphical structure comprising a plurality of nodes and a plurality of graphical edges as described in U.S. patent application Ser. No. 17/978,960, filed on 1 Nov. 2022, titled SYSTEMS AND METHODS FOR GENERATING AN EXTENSIBLE DIGITAL FORMULATION NETWORK MODEL AND IMPLEMENTING AN INTELLIGENT FORMULATION USING THE FORMULATION NETWORK MODEL, which is incorporated herein in its entirety by this reference. It shall be noted that the phrase "probabilistic graphical model" may also be referred to herein as a "formulation probabilistic graphical model", a "quantitative formulation network", or the like.

In such embodiments, when new formulation and/or product data is created and/or acquired by a formulation service or system implementing the method 200, S240 may function to infuse the new formulation data, product data, and/or formulation intelligence derived from the new formulation data (and/or product data) into one or more target quantitative formulation graphical networks (e.g., the new formulation data may be associated with the above-mentioned subscriber-associated activities (e.g., formulator-performed experiments or the like). In one or more embodiments, S240 may function to initialize a feedback loop or iteration mechanism that ingests the new formulation and/or product intelligence data into a target pre-existing quantitative formulation graphical network, thereby causing a re-estimation of the parameters of the target pre-existing quantitative formulation graphical network and/or a re-alignment of the graphical structure of the target pre-existing quantitative formulation graphical network.

In one implementation, based on the new experimental findings data or experimental results data (e.g., new formulation data, product data, and/or formulation intelligence), S240 may function to re-estimate the parameters of a target quantitative formulation graphical network model to which the new experimental findings data or experimental corresponds. In one or more embodiments of this implementation, S240 may function to re-estimate or re-learn the probability distributions associated with the graphical nodes of the target pre-existing quantitative formulation graphical network. For instance, in a non-limiting example, the parameters (e.g., probability distributions associated with the graphical nodes) may be of a first set of probabilistic values and, after a re-learning process of the parameters based on the new experimental findings data or experimental results data, the parameters or a subset of the parameters may be a second set of probabilistic values.

In another implementation, based on the new experimental findings data or experimental results data, S240 may function to trigger or cause a relearning of a graphical structure (e.g., graphical nodes and graphical edges) of a target quantitative formulation graphical network, and re-estimate the probability distributions corresponding to the target quantitative formulation graphical network via an iterative (model) update loop or the like to which the new experimental findings data or experimental corresponds.

At least one technical advantage of iteratively tuning, updating, or evolving, a target quantitative formulation graphical network model may extend or fine-tune a utility (e.g., predicative capability) of the target quantitative formulation graphical network model.

It shall be noted that, in one or more embodiments, automatically adapting the formula-generating machine learning model may include foreclosing an exploration phase of the formula-generating machine learning model based on the corpus of synthetic experimental findings data comprising one or more pieces of synthetic experimental findings data that indicates the exploration phase as successful. Accordingly, in such embodiments, S240 may function to automatically assess, by one or more computers, the corpus of synthetic experimental findings data, and based on the automatic assessment identifying that the at least one distinct set of product formulation parameter values increases a satisfaction of the one or more product formulation objectives, S240 may function to tune the formula-generating machine learning model to reduce or eliminate an exploration phase for parameter values of the one or more formulation design variables.

It shall be further noted that, in one or more embodiments, automatically adapting the formula-generating machine learning model may include increasing an exploration phase of the formula-generating machine learning model based on the corpus of synthetic experimental findings data comprising one or more pieces of synthetic experimental findings data that indicates the exploration phase as unsuccessful. Accordingly, in such embodiments, S240 may function to automatically access the corpus of synthetic experimental findings data and based on the automatic assessment identifying that the at least one distinct set of product formulation parameter values decreases a satisfaction of the one or more product formulation objectives, S240 may function to tune the formula-generating machine learning model to increase an exploration phase.

2.50 Modifying the Formulation Optimization Function

Optionally, S250, which includes modifying the formulation optimization function, may function to modify one or more components of the formulation optimization function. In one or more embodiments, S250 may function to receive an input from a formulator or subscriber requesting an adjustment or modification to, at least one of, the one or more formulation objectives, the one or more formulation design variables, and/or the one or more formulation constraints of a target formulation optimization function constructed by S210.

Preferably, in one or more embodiments, S250 may function to intelligently inform a target formulator or subscriber of one or more formulation constraints that may be restricting or preventing an attainment of a subject formulation optimization function via a user interface notification, a third-party messaging channel, or any other suitable mechanism that may function to obtain the target formulator or subscriber focus. Accordingly, in such embodiments, S250 may function to receive one or more inputs from a formulator or the like that requests an adjustment or modification to one or more components of the subject formulation optimization function to resolve any deficiencies/constraints that may have been identified by the intelligent product formulation service (e.g., the system or service 100).

In operation, S250 may function to receive one or more inputs from the target formulator or subscriber requesting a modification to one or more formulation objectives associated with the subject formulation optimization function. Additionally, or alternatively, in one or more embodiments, S250 may function to receive one or more inputs from the target formulator or subscriber requesting to augment (e.g., add) one or more distinct formulation design variables (e.g., ingredients) and/or remove (e.g., delete) one or more pre-defined formulation design variables associated with the subject formulation optimization function. Additionally, or alternatively, in one or more embodiments, S250 may function to receive one or more inputs from the target formulator or subscriber requesting to augment (e.g., add) one or more formulation constraints and/or remove (e.g., delete) one or more pre-defined formulation constraints associated with the subject formulation optimization function.

It shall be noted that, in response to or based on receiving a formulator or subscriber request to modify a target formulation optimization function, S250 may function to re-execute one or more of S210, S220, S230, S240, and/or S250.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for adaptively generating experimental product formulations for accelerating a formulation design of a target physical product, the computer-implemented method comprising:

at a remote formulation service that is implemented by a network of distributed computers:

constructing, by one or more computer processors, a formulation objective function based on a plurality of distinct product-informative formulation parameters of the target physical product, wherein the plurality of distinct product-informative formulation parameters include:

(a) one or more product formulation objectives set for the target physical product;

(b) one or more formulation design variables associated with the target physical product; and (c) one or more product formulation constraints imposed on the one or more formulation design variables associated with the target physical product;

iteratively generating, by the one or more computer processors via a probabilistic graphical model, distinct sets of product formulation parameter values based on the plurality of distinct product-informative formulation parameters of the formulation objective function;

automatically executing, by the one or more computer processors using a formulation simulation module, one or more computer-based formulation simulations that simulate a formulation performance of at least one distinct set of product formulation parameter values of the distinct sets of product formulation parameter values based on the probabilistic graphical model generating the at least one distinct set of product formulation parameter values, wherein each of the one or more computer-based formulation simulations enables a bypass of real-world experimentation of the at least one distinct set of product formulation parameter values;

automatically constructing, by the one or more computer processors a corpus of synthetic experimental findings data based on simulation output data of the one or more computer-based formulation simulations;

automatically adapting, by the one or more computer processors, the probabilistic graphical model using the corpus of synthetic experimental findings data that causes an intermediate model update of the probabilistic graphical model;

generating, by the one or more computer processors via the adapted probabilistic graphical model, an adapted set of product formulation parameter values that likely satisfy the one or more product formulation objectives thereby enabling an accelerated creation of the target physical product; and generating, by the one or more computer processors, a target formulation proposal for creating the target physical product using the adapted set of formulation parameter values that likely satisfy the one or more product formulation objectives.

2. The computer-implemented method according to claim 1, wherein:

automatically adapting the probabilistic graphical model includes foreclosing an exploration phase of the probabilistic graphical model based on the corpus of synthetic experimental findings data comprising one or more pieces of synthetic experimental findings data that indicates the exploration phase as successful.

3. The computer-implemented method according to claim 1, wherein:

automatically adapting the probabilistic graphical model includes automatically assessing the corpus of synthetic experimental findings data; and based on the automatic assessment identifying that the corpus of synthetic experimental findings data associated with the at least one distinct set of product formulation parameter values increases a satisfaction of the one or more product formulation objectives, tuning the probabilistic graphical model to reduce or eliminate an exploration phase of parameter values for the one or more formulation design variables.

4. The computer-implemented method according to claim 1, wherein:

automatically adapting the probabilistic graphical model includes increasing an exploration phase of the probabilistic graphical model based on the corpus of synthetic experimental findings data comprising one or more pieces of synthetic experimental findings data that indicates the exploration phase as unsuccessful.

5. The computer-implemented method according to claim 1, wherein:
automatically adapting the probabilistic graphical model includes automatically assessing the corpus of synthetic experimental findings data; and
based on the automatic assessment identifying that the corpus of synthetic experimental findings data associated with the at least one distinct set of product formulation parameter values decreases a satisfaction of the one or more product formulation objectives, tuning the probabilistic graphical model to increase an exploration phase of parameter values for the one or more formulation design variables.

6. The computer-implemented method according to claim 1, wherein:
each of the one or more product formulation constraints relates to a model-immutable boundary that restricts the one or more formulation design variables to a predefined range of possible values.

7. The computer-implemented method according to claim 1, wherein:
each distinct product formulation parameter value of the distinct sets of product formulation parameter values relates to a model-derived composition value for a distinct one of the one or more formulation design variables of the formulation objective function.

8. The computer-implemented method according to claim 1, wherein:
each distinct set of product formulation parameter values of the distinct sets of product formulation parameter values relates to a model inference comprising a composition value for each of the one or more formulation design variables of the formulation objective function.

9. The method according to claim 1, wherein:
the probabilistic graphical model is associated with a formulation probabilistic graphical model; and
automatically adapting the probabilistic graphical model includes re-estimating a plurality of distinct parameters of the formulation probabilistic graphical model based on the corpus of synthetic experimental findings data.

10. The method according to claim 1, wherein:
the probabilistic graphical model is associated with a formulation probabilistic graphical model; and
automatically adapting the probabilistic graphical model includes (1) re-learning a structure of the formulation probabilistic graphical model based on the corpus of synthetic experimental findings data and (2) re-estimating a plurality of distinct parameters of the formulation probabilistic graphical model based on the corpus of synthetic experimental findings data.

11. The method according to claim 1, further comprising:
terminating an execution of the probabilistic graphical model based on identifying a formulation termination request, wherein the formulation termination request indicates that the adapted set of product formulation parameter values satisfies the one or more product formulation objectives set for the target physical product.

12. The method according to claim 1, further comprising:
identifying a quantitative formulation network associated with the target physical product, wherein a subset of the one or more formulation design variables is automatically defined by the remote formulation service based on the quantitative formulation network.

13. The method according to claim 1, wherein:
a subset of the one or more product formulation objectives set for the target physical product is obtained from the target subscriber via a formulation design graphical user interface;
a subset of the one or more formulation design variables associated with the target physical product is obtained from the target subscriber via the formulation design graphical user interface; and
a subset of the one or more product formulation constraints imposed on the one or more formulation design variables is obtained from the target subscriber via the formulation design graphical user interface.

14. The method according to claim 1, wherein:
the probabilistic graphical model is configured to maximize the one or more product formulation objectives set for the target physical product over minimizing a predictive uncertainty of the distinct sets of product formulation parameter values generated by the probabilistic graphical model.

15. The method according to claim 14, wherein:
an amount of prediction uncertainty of the at least one distinct set of product formulation parameter values is less than an amount of prediction uncertainty of the adapted set of product formulation parameter values.

16. The method according to claim 14, wherein:
an amount of prediction uncertainty of the at least one distinct set of product formulation parameter values is greater than an amount of prediction uncertainty of the adapted set of product formulation parameter values.

17. A computer-implemented method for adaptively generating experimental product formulations for accelerating a formulation design of a target product, the computer-implemented method comprising:
at a remote formulation service that is implemented by a network of distributed computers:
constructing, by one or more computers of the network of distributed computers, a formulation objective function based on a plurality of distinct product-informative formulation parameters of the target product, wherein the plurality of distinct product-informative formulation parameters include:
(a) one or more product formulation objectives set for the target product;
(b) one or more formulation design variables associated with the target product; and
(c) one or more product formulation constraints imposed on the one or more formulation design variables associated with the target product;
generating, by the one or more computers of the network of distributed computers via a probabilistic graphical model, a distinct set of product formulation parameter values for the one or more formulation design variables based on the formulation objective function;
automatically performing, by the one or more computers of the network of distributed computers using a formulation simulation module, one or more computer-based formulation simulations that simulate a formulation performance of the distinct set of product formulation parameter values, wherein each of the one or more computer-based formulation simulations enables a bypass of real-world experimentation of the distinct set of product formulation parameter values;
constructing, by the one or more computers of the network of distributed computers, a corpus of synthetic experimental findings data based on simulation output data of the one or more computer-based formulation simulations;

automatically adapting, by the one or more computers of the network of distributed computers, the probabilistic graphical model using the corpus of synthetic experimental findings that causes an intermediate model update of the probabilistic graphical model;

generating, by the one or more computers of the network of distributed computers via the adapted probabilistic graphical model, an adapted set of product formulation parameter values that likely satisfy the one or more product formulation objectives thereby enabling an accelerated creation of the target product; and generating, by the one or more computers of the network of distributed computers, a target formulation proposal for creating the target physical product using the adapted set of formulation parameter values that likely satisfy the one or more product formulation objectives.

18. The computer-implemented method according to claim 17, further comprising:

constructing, by the one or more computers, a corpus of ground truth experimental findings data based on subscriber-provided experimental findings data.

19. A computer-implemented method for adaptively generating experimental product formulations for accelerating a formulation design of a target physical product, the computer-implemented method comprising:

constructing, by one or more computer processors, a formulation objective function based on a plurality of distinct product-informative formulation parameters of the target physical product, wherein the plurality of distinct product-informative formulation parameters include:
  (a) one or more formulation objectives set for the target physical product;
  (b) one or more formulation design variables associated with the target physical product; and
  (c) one or more product formulation constraints imposed on the one or more formulation design variables associated with the target physical product;

iteratively generating, by the one or more computer processors via a probabilistic graphical model, distinct sets of product formulation parameter values based on the plurality of distinct product-informative formulation parameters of the formulation objective function;

automatically executing, by the one or more computer processors using a formulation simulation module, one or more computer-based formulation simulations that simulate a formulation performance of at least one distinct set of product formulation parameter values of the distinct sets of product formulation parameter values, wherein each of the one or more computer-based formulation simulations enables a bypass of real-world experimentation of the at least one distinct set of product formulation parameter values;

automatically constructing, by the one or more computer processors, a corpus of synthetic experimental findings data based on simulation output data of the one or more computer-based formulation simulations;

automatically adapting, by the one or more computer processors, the probabilistic graphical model using the corpus of synthetic experimental findings data that causes an intermediate model update of the probabilistic graphical model, wherein the adaptation of the probabilistic graphical model enables a reduction in a total number of real-world experiments required to identify a target set of formulation parameter values that satisfy the formulation objective function;

generating, by the one or more computer processors via the adapted probabilistic graphical model, an adapted set of product formulation parameter values that likely satisfy the one or more formulation objectives thereby enabling an accelerated creation of the target physical product; and generating, by the one or more computer processors, a target formulation proposal for creating the target physical product using the adapted set of formulation parameter values that likely satisfy the one or more product formulation objectives.

* * * * *